2,700,059

PROPENE POLYETHERS

Reginald Harold Hall and Edward Severin Stern, Sutton, England, assignors to The Distillers Company Limited, Edinburgh, Scotland, a British company No Drawing. Application January 29, 1951, Serial No. 208,450

Claims priority, application Great Britain February 11, 1950

11 Claims. (Cl. 260—615)

The present invention relates to the preparation of oxygen containing compounds. The present invention relates particularly to the preparation of oxygen-containing propene derivatives.

According to the present invention a propane derivative of the formula:

$$RO-CH_2-CHR^3-CH(OR^1)(OR^2)$$

in which R, $R^1$ and $R^2$ are selected from the group consisting of alkyl, aryl, aralkyl and cycloalkyl groups and $R^3$ is selected from the group consisting of hydrogen and alkyl groups, is pyrolysed in the presence of a cracking catalylst and in a homogeneous phase at a temperature between 200° C. and 450° C., preferably between 325° C. and 425° C. to give a mixture of a di-ether of 1:3-dihydroxypropene of the formula:

$$RO-CH_2-CR^3=CH(OR^1)$$

and an acrolein acetal of the formula:

$$CH^2=CR^3-CH(OR^1)(OR^2)$$

wherein in each formula R, $R^1$, $R^2$ and $R^3$ have the significance indicated above, and said propene ether and said acrolein acetal are isolated from the reaction product.

According to a preferred embodiment of the present invention a propane derivative of the formula:

$$R^3O-CH_2-CHR^6-CH(OR^4)(OR^5)$$

in which $R^3$, $R^4$ and $R^5$ are selected from the group consisting of lower alkyl radicals such as ethyl, methyl, butyl, propyl, etc., radicals, and $R^6$ is selected from the group consisting of hydrogen and methyl groups, is subjected to pyrolysis according to the process of the invention.

The pyrolysis may be carried out in the liquid or vapour phase. The homogeneous catalyst is preferably an acidic catalyst and is suitably sulphuric acid or an ester thereof such as di-isopropyl sulphate, dimethyl sulphate, ethyl hydrogen sulphate and the like. Non-acidic homogeneous cracking catalysts such as quinoline may also be used. It is expedient for the pyrolysis to be carried out in the presence of a stabilising agent such as pyridine, quinoline, collidine and the like. The reaction according to the present invention may be formulated as follows:

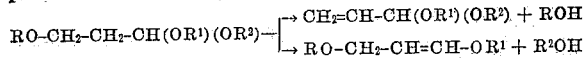

In this formula R, $R^1$ and $R^2$ represent the same or different groups within the definition given above. The temperature at which the splitting off of the compounds ROH and $R^2OH$ occurs varies within fairly wide limits and depends on the exact nature of these compounds. We have found that the pyrolysis process may be carried out to favour the production of either the di-ether of 1:3-dihydroxypropene or the acrolein acetal by varying the reaction conditions, for example contact time and the reaction temperature, the production of the acrolein acetal being favoured under the more severe conditions. This is the case as under more severe conditions the di-ether of 1:3-dihydroxypropene undergoes isomerisation, forming the corresponding acrolein derivative.

The two products of the cracking reaction, that is the di-ether of 1:3-dihydroxypropene and the acrolein acetal may be separated from the mixture resulting from the cracking process and from each other, for example by fractional distillation, preferably under reduced pressure.

Many of the acrolein acetals produced according to the present invention are new, although some of these acrolein acetals are known in the art, but have not been readily available heretofore. The process of the present invention, therefore, affords a simple and economical way of producing the acrolein acetals. The new acrolein acetals prepared according to the present invention include: acrolein dibutyl acetal, acrolein di-n-propyl acetal, acrolein diisopropyl acetal and acrolein dibenzyl acetal.

The di-ethers of 1:3-dihydroxypropene prepared according to the present invention are new compounds. The new di-ethers of 1:3-dihydroxypropene prepared according to the present invention include: 1:3-dimethoxypropene, 1:3-diethoxypropene, 1:3-dibutoxypropene, 1:3-di-n-propoxypropene, 1:3-diisopropoxypropene, 1:3-dibenzyloxypropene, 1:3-diethoxy-2-methylpropene, 1-ethoxy-3-butoxyprop-1-ene, and 1-butoxy-3-ethoxyprop-1-ene.

The new di-ethers of 1:3-dihydroxypropene are useful intermediates in the production of valuable organic compounds and may, for example, be hydrogenated to give the corresponding 1:3-propylene glycol ethers. These propylene glycol ethers form valuable solvents and since the starting materials of the present invention are easily and cheaply prepared from acrolein or beta-alkoxypropionaldehydes, these compounds now become readily accessible.

Furthermore, as the acrolein acetal may be reconverted into the trihydroxypropane ether starting material under the conditions in which the acrolein is converted into these compounds, it is a feature of the invention to manufacture the di-ether of 1:3-dihydroxypropene by the pyrolysis of the 1:1:3-trihydroxypropane ether into a mixture of the corresponding di-ether of 1:3-dihydroxypropene and the acrolein acetal, isolating these two products, and reconverting the acrolein derivative into the 1:1:3-trihydroxypropane ether starting material. As indicated above the formation of the di-ether of 1:3-dihydroxypropene is enhanced when using the less severe reaction conditions within the limits specified above, and consequently, if the conditions of the pyrolysis are so arranged that some of the starting material remains unchanged throughout the reaction, the yield of the di-ether of 1:3-dihydroxypropene is enhanced, compared with the yield obtained when the starting material is completely pyrolysed.

When, on the other hand, the acrolein acetal is the desired product, the pyrolysis may be carried out under the more severe conditions falling within the operating limits specified above, to favour the yield of this acrolein acetal, and furthermore, on fractional distillation of the product obtained, the di-ether of 1:3-dihydroxypropene prepared may be separated and reconverted to the starting material by reaction with the corresponding hydroxy compound split off in the reaction. As the 1:3-dihydroxypropene di-ether is generally higher boiling than the acrolein acetal, it need not be separated from the distillation residue after removal of the acrolein acetal.

The di-ethers of 1:3-dihydroxypropene prepared according to the present invention are substituted vinyl ethers and therefore will undergo the known transformations of such ethers. The conversion of di-ethers of 1:3-dihydroxypropene and also of the acrolein acetals obtained by the cracking process back into the trihydroxypropane starting material may be effected by condensing said compound in the presence of an acid catalyst for example at room temperature with the desired hydroxy compound.

The propane derivatives which form the starting materials of the present invention may be prepared in any suitable way, for example, by reacting acrolein or beta-alkoxypropionaldehyde with the desired hydroxy compounds, such as methyl, ethyl, propyl, butyl, ethylhexyl, iso-octyl or cyclohexyl alcohols, or phenol. Examples of suitable starting materials include 1:1:3-trimethoxypropane, 1:1:3-triethoxypropane, 1:1:3-tributoxypropane, 1:1 - dibutoxy - 3 - ethoxypropane, 1:1 - diethoxy - 3 - butoxy propane, 1:1:3-tri-n-propoxypropane, 1:1:3-triisopropoxypropane, 1:1:3-tribenzyloxypropane and 1:1:3-triethoxy-2-methylpropane. The last six compounds may be prepared as described below.

1:1-dibutoxy-3-ethoxypropane 118 grams of beta-ethoxypropionaldehyde (B. Pt. 66.5° C. at 67 mm. Hg; $n_D^{20}$ 1.4026) are added rapidly to 300 ml. of normal butyl alcohol containing 1 ml. of concentrated sulphuric acid. The mixture warms spontaneously to 25–30° C. and is thereafter kept at room temperature for 3 days. The product is neutralised with sodium butoxide in solution in normal butyl alcohol, 0.5 gram of sodium acetate added thereto, and the mixture rapidly distilled under reduced pressure and thereafter fractionated yielding 150 grams of 1:1-dibutoxy-3-ethoxypropane (B. Pt. 98° C. at 0.8 mm. Hg; $n_D^{20}$ 1.4215).

1:1-diethoxy-3-butoxypropane 92.5 grams of beta-butoxypropionaldehyde (B. Pt. 62° C. at 15 mm. Hg; $n_D^{20}$ 1.4156), which is obtained by the alkaline condensation of n-butyl alcohol and acrolein, are added rapidly to 450 ml. of ethyl alcohol containing 1 gram of hydrogen chloride and 5 grams of anhydrous calcium chloride. The mixture warms spontaneously and is thereafter kept at room temperature for 72 hours. The product is neutralised with sodium ethoxide in solution in ethyl alcohol and the mixture rapidly distilled under reduced pressure and thereafter fractionated yielding 91 grams of 1:1-diethoxy-3-butoxypropane (B. Pt. 100° C. at 10 mm. Hg; $n_D^{20}$ 1.4141).

1:1:3-tri-n-propoxypropane

A mixture of 375 ml. acrolein (92% purity), 1875 ml. n-propanol containing 15 ml. concentrated hydrochloric acid, and 500 ml. methylene dichloride is distilled through a 3 ft.-Vigreux column fitted with a phase-separating still-head which continuously removes the upper (aqueous) layer of the distillate and returns the lower layer to the column as reflux. When no more water appears to be formed, the cold reaction mixture is neutralised with a solution of 3.5 grams sodium in n-propanol and is rapidly distilled, finally under reduced pressure. Fractionation of the distillate in vacuo gives 31 grams of a low-boiling, impure fraction (B. Pt. 96–104°/17 mm. Hg, $n_D^{20}$ 1.423–1.425), and then 1015 grams of pure 1:1:3-tri-n-propoxypropane (93% of theory), B. Pt. 109°/12 mm. Hg, $n_D^{20}$ 1.4175.

1:1:3-triisopropoxypropane

A mixture of 375 ml. acrolein (92% purity), 1875 ml. isopropanol containing 15 ml. concentrated hydrochloric acid and 360 ml. methylene dichloride is refluxed as described immediately above. When no more water is formed (after about 60 hr.) the cold reaction mixture is made alkaline with 4.5 grams sodium dissolved in isopropanol and is then rapidly distilled, finally under reduced pressure. A large amount of residue (about 280 grams) remains in the flask. The part (570 grams) of the distillate boiling above 40°/100 mm. Hg, on fractional distillation, gives (i) About 50 grams of low-boiling material, B. Pt. 43–88°/11 mm. Hg, $n_D^{20}$ 1.400–1.415, and (ii) 308 grams of 1:1:3-triisopropoxypropane (28% of theory), B. Pt. 89°/11 mm. Hg, $n_D^{20}$ 1.4096.

1:1:3-tribenzyloxypropane

A mixture of 225 ml. acrolein, 1512 grams benzyl alcohol, 350 ml. methylene dichloride, and 15 ml. concentrated hydrochloric acid is refluxed as described above, with continuous azeotropic removal of water. When the reaction is complete the cold product is neutralised with 5 grams sodium hydroxide and distilled in vacuo. The distillate on subsequent fractionation gives 823 grams of pure 1:1:3-tribenzyloxypropane (76% of theory), B. Pt. 243–246°/0.5 mm. Hg, 180°/5×10⁻⁴ mm. Hg, $n_D^{20}$ 1.5580.

1:1:3-triethoxy-2-methylpropane 210 grams of freshly distilled α-methylacrolein, 2000 grams of ethanol, 300 grams of methylene dichloride and 4 grams of 30% aqueous hydrochloric acid are rapidly distilled through a 3-ft. Vigreux-column; from the distillate, which separates into two layers, the water formed (upper layer) is continuously removed and the lower layer is returned to the column as reflux. When no more water forms heating is discontinued, and the mixture is treated with 1 gram of sodium dissolved in ethanol and then fractionally distilled, giving, besides methylene dichloride and unchanged ethanol, 32 grams of α-methyl-acrolein diethyl acetal, B. Pt. 68.5°/67 mm. Hg, $n_D^{20}$ 1.4079, 270 grams of 1:1:3-triethoxy-2-methylpropane, B. Pt. 75°/11.5 mm. Hg, $n_D^{20}$ 1.4083, and 31 grams of higher-boiling material, probably 6-ethoxy-2:5-dimethyl-2-diethoxymethyltetrahydropyran, B. Pt. 122–125°/11.5 mm. Hg, $n_D^{20}$ 1.4348.

The following examples are given to illustrate the process of the present invention. The parts and percentages referred to are by weight.

Example 1

A gaseous mixture of nitrogen and a homogeneous mixture consisting of 135 parts of 1:1:3-trimethoxypropane, 0.18 part of diisopropyl sulphate and 1 part of pyridine is passed through a glass tube maintained at 355° C., the contact time being 55 seconds. The product obtained on fractional distillation under reduced pressure yields 63.1 parts of a methyl alcohol-acrolein dimethyl acetal azeotrope, 37.5 parts of 1:3-dimethoxypropene (B. Pt. 63.8° C. at 98 mm. Hg; $n_D^{20}$ 1.4200) and 23 parts of unchanged 1:1:3-trimethoxypropene.

On hydrogenation of the 1:3-dimethoxypropene in the presence of Raney nickel in ethyl alcohol the theoretical yield of 1:3-dimethoxypropane (B. Pt. 105.5° C.; $n_D^{20}$ 1.3898) is obtained.

Example 2

A gaseous mixture of nitrogen, 123 parts of 1:1:3-tributoxypropane, 0.1 part of di-isopropyl sulphate and 0.5 part of pyridine is passed through a glass tube maintained at 350° C., the contact time being 70 seconds. The product obtained on fractional distillation yields 32.5 parts of butyl alcohol, 35 parts of acrolein dibutyl acetal (B. Pt. 93° C. at 17 mm. Hg; $n_D^{20}$ 1.4202), 16 parts of 1:3-dibutoxypropene (B. Pt. 110.5° C. at 16 mm. Hg; $n_D^{20}$ 1.4348) and 18 parts of unchanged 1:1:3-tributoxypropane.

On hydrogenating 6.9 parts of 1:3-dibutoxypropene in the presence of Raney nickel in ethyl alcohol, 6.5 parts of 1:3-dibutoxypropane (B. Pt. 96.8° C. at 11 mm. Hg; $n_D^{20}$ 1.4169) are obtained.

Example 3

114 parts of 1:1-dibutoxy-3-ethoxypropane, 0.1 part of di-isopropyl sulphate and 0.5 part of pyridine are passed with nitrogen through a glass tube maintained at 355° C., the contact time being 100 seconds. The product obtained on fractional distillation yields 12 parts of ethyl alcohol containing a little pyridine, 43.1 parts of acrolein dibutyl acetal (B. Pt. 91° C. at 14 mm. Hg; $n_D^{20}$ 1.4202) and 40 parts of unchanged 1:1-dibutoxy-3-ethoxypropane.

Example 4

A mixture consisting of 90 parts of 1:1-diethoxy-3-butoxypropane, 0.08 part of di-isopropyl sulphate and 0.6 part of quinoline is passed with nitrogen through a glass tube maintained at 350° C., the contact time being 71 seconds. The product obtained on fractional distillation gives 11.5 parts of ethyl alcohol, 2 parts of slightly impure acrolein diethyl acetal (B. Pt. 35–37° C. at 17 mm. Hg; $n_D^{20}$ 1.4029) 35 parts of 3-butoxy-1-ethoxyprop-1-ene (B. Pt. 74° C. at 10 mm. Hg; $n_D^{20}$ 1.4296) and 12 parts of unchanged 1:1-diethoxy-3-butoxypropane.

On hydrogenating 10 parts of the 3-butoxy-1-ethoxy-prop-1-ene over Raney nickel in ethyl alcohol 9.2 parts of 3-butoxy-1-ethoxypropane (B. Pt. 185° C., at 734 mm. Hg; $n_D^{20}$ 1.4101) are obtained.

Example 5

A mixture of 208 parts of triethoxypropane, 0.25 part of di-isopropyl sulphate and 1.6 parts of quinoline is passed with nitrogen through a glass tube maintained at 365° C., the contact time being 75 seconds. The product obtained on fractional distillation comprises 42 parts of ethyl alcohol containing acrolein diethyl acetal, 25 parts of acrolein diethyl acetal (B. Pt. 45–46° C. at 38 mm. Hg; $n_D^{20}$ 1.4020), 51 parts of 1:3-diethoxypropene (B. Pt. 52° C. at 12 mm. Hg; $n_D^{20}$ 1.4240) and 53 parts of unchanged 1:1:3-triethoxypropane.

Example 6

A mixture of 122 parts of 1:1:3-triethoxypropane, 0.75 part of dimethyl sulphate, and 1.8 parts of pyridine, is passed through a glass tube maintained at 370° C., the contact time being 85 seconds. On fractional distillation of the product acrolein diethyl acetal in a yield of 35% and 1:3-diethoxypropene in a yield of 17% are obtained.

Example 7

A mixture of 135 parts of 1:1:3-triethoxypropane and 0.4 part of concentrated sulphuric acid is passed through a glass tube maintained at 360° C., the contact time being 85 seconds. The product is collected in a receiver containing 3 parts of quinoline and 0.2 part of quinol. On fractional distillation of the product acrolein diethyl acetal in a yield of 37 and 1:3-diethoxypropene in a yield of 5% are obtained.

Example 8

A mixture of 100 parts of 1:1:3-triethoxypropane and 0.184 part of concentrated sulphuric acid is heated in a flask attached to a fractionating column and the products are distilled out of the system as they are formed. Fractional distillation of the product yields 27.55 parts of ethyl alcohol, 29.5 parts of acrolein diethyl acetal, 11.9 parts of 1:3-diethoxypropene and 12.5 parts of unchanged 1:1:3-triethoxypropane.

38 parts of the acrolein diethyl acetal are dissolved in about 50 parts of ethyl alcohol and the solution treated below 3° C. with 1 part of hydrogen chloride in solution in 50 parts of ethyl alcohol. The mixture is kept at room temperature for several days, then made just alkaline by the cautious addition of ethanolic sodium ethoxide solution and the excess alkali neutralised with carbon dioxide. On fractional distillation of the product 47 parts of pure 1:1:3-triethoxypropane are obtained.

Example 9

1 part of pyridine and 0.2 part of di-isopropyl sulphate are added to 176 parts of 1:1:3-triethoxypropane and the mixture is passed in the gaseous phase at a constant rate through a glass tube maintained at 365° C., the contact time being 76 seconds. The conversion efficiency to acrolein diethyl acetal is 35% and to 1:3-diethoxypropene is 48%.

The process of this example is repeated exactly as described above with the exception that the temperature indicated in column 1, and the contact time indicated in column 2, in Table I, are employed. The percentage conversion efficiencies to acrolein diethyl acetal and to 1:3-diethoxypropene are given in columns 3 and 4 respectively in Table I.

TABLE I

| Column 1, ° C. | Column 2, seconds | Column 3, percent | Column 4, percent |
| --- | --- | --- | --- |
| 355 | 65 | 31 | 55 |
| 300 | 133 | 25 | 58 |
| 255 | 240 | 19 | 42 |

87.5 parts of 1:3-diethoxypropene containing 0.1 mol.-percent of di-isopropyl sulphate and 1 mol.-percent of quinoline are passed with nitrogen through a glass tube maintained at 350–360° C., at a rate such that the contact time is 53 seconds. The product on fractional distillation yields 3 parts of ethyl alcohol, 14 parts of acrolein diethyl acetal and 48.5 parts of unchanged 1:3-diethoxypropene.

Example 10

1.5 parts of pyridine and 0.18 part of di-isopropyl sulphate were added to 80 parts of 1:1:3-triethoxypropane and the homogeneous mixture was passed during 6 hours at a constant slow rate through a glass tube measuring 3 feet 6 inches in length, and having an internal diameter of 0.75 inch. This tube was kept at 350° C.; the product, which condensed in a water cooled condenser, weighed 78.5 parts and had a refractive index $n_D^{20}$ 1.4032. Fractional distillation, under reduced pressure, gave the following main fractions, as well as intermediate fractions.

(1) 16.6 parts of ethanol, B. P. 29°/76 mm. Hg, (2) 19 parts of acrolein diethyl acetal, B. P. 59–60°/76 mm., $n_D^{20}$ 1.4021, (3) 19.4 parts of 1:3-diethoxypropene, B. P. 88°/76 mm., $n_D^{20}$ 1.4248, (4) 8.6 parts of unchanged 1:1:3-triethoxy propane, B. P. 70°/14 mm., $n_D^{20}$ 1.4080.

On hydrogenation in ethyl acetate over 1% palladium-charcoal catalyst, 2.5 grams of the 1:3-diethoxypropene absorbed 484 cc. of hydrogen at 13° C. and 742 mm. of Hg pressure in 14 min., (equivalent to 1.04 olefinic bonds); absorption then ceased. The product of the hydrogenation contained no acetal, but on fractional distillation gave the diethyl ether of propane-1:3-diol (i. e., 1:3-diethoxypropane), B. P. 140°/742 mm., $n_D^{20}$ 1.3982.

Example 11

A mixture consisting of 327 parts of 1:1:3-tri-n-propoxypropane, 0.27 part of diisopropyl sulphate, and 6 parts of quinoline is passed with nitrogen through a glass tube at 350° C.±5° so that the contact time is 52 seconds. Fractional distillation of the product obtained gives 67 parts of n-propanol (B. Pt. 44°/70 mm. Hg, $n_D^{20}$ 1.3858), 81.5 parts of acrolein di-n-propyl acetal (B. Pt. 54°/12 mm. Hg, $n_D^{20}$ 1.4120), 86.5 parts of 1:3-n-propoxypropene (B. Pt. 73°/12 mm., Hg, $n_D^{20}$ 1.4287), and 60.5 parts of unchanged 1:1:3-tri-n-propoxypropane (B. Pt. 113°/15 mm. Hg, $n_D^{20}$ 1.4179).

Hydrogenation of the 1:3-di-n-propoxypropene in ethanol at room temperature affords 1:3-di-n-propoxypropane, B. P. 165°/750 mm., $n_D^{20}$ 1.4080.

Example 12

A mixture comprising 86 parts of 1:1:3-triisopropoxypropane, 0.07 part of diisopropyl sulphate, and 1.0 part of quinoline is passed with nitrogen through a glass tube at 350° C.±5° so that the contact time is 52.5 seconds. The reaction product is fractionally distilled, giving 20.0 parts of isopropanol, B. Pt. 33°/66 mm. Hg, $n_D^{20}$ 1.3779, 16.5 parts of acrolein diisopropyl acetal, B. Pt. 39°/12 mm. Hg, $n_D^{20}$ 1.4053, 27.5 parts of 1:3-diisopropoxypropene, B. Pt. 63°/12 mm. Hg, $n_D^{20}$ 1.4225, and 7.0 parts of unchanged 1:1:3-triisopropoxypropane, B. Pt. 89°/11 mm., Hg, $n_D^{20}$ 1.4096.

Hydrogenation of 12.8 parts of 1:3-diisopropoxypropene in 55 parts of ethanol over 6.5 parts of Raney nickel at 19° and 746 mm. Hg, results in the absorption of 0.97 mole of hydrogen and gives 10.8 parts of 1:3-diisopropoxypropane, B. Pt. 159–160°/750 mm., Hg, $n_D^{20}$ 1.4015.

Example 13

A mixture of 543 parts of 1:1:3-tribenzyloxypropane, 0.25 part of diisopropyl sulphate, and 6 parts of quinoline is passed with nitrogen through a glass tube kept at 360° C.±5°, the contact time being 46 seconds. Fractional distillation of the product gives 64 parts of benzyl alcohol, 50 parts of 1:3-dibenzyloxypropene, B. P. 90°/5×10⁻⁴ mm., $n_D^{20}$ 1.5557, and 57 parts of acrolein dibenzyl acetal, B. P. 120°/5×10⁻⁴ mm., $n_D^{20}$ 1.5469. Much high-boiling material is also obtained which probably contains 1:1:3-tribenzyloxypropane, B. P. 183°/3×10⁻⁴ mm., $n_D^{20}$ 1.5596.

Example 14

A mixture of 263 parts of 1:1:3-triethoxy-2-methylpropane, 0.25 part of diisopropyl sulphate, and 5.1 parts of quinoline is passed with nitrogen through a glass tube at 350° C. so that the contact time is 51 seconds. Fractional distillation of the product gives 50 parts of ethanol, B. P. 27°/70 mm., $n_D^{20}$ 1.3640, 84 parts of α-methylacrolein diethyl acetal, B. P. 68°/67 mm., 35°/12 mm., $n_D^{20}$ 1.4083, 59 parts of 1:3-diethoxy-2-methylpropene, B. P. 54°/14 mm., $n_D^{20}$ 1.4259, and 33 parts of unchanged 1:1:3-triethoxy-2-methylpropane, B. P. 75°/12 mm., $n_D^{20}$ 1.4089.

Hydrogenation of 18 parts of 1:3-diethoxy-2-methylpropene in 60 parts of ethanol over 5 parts of Raney nickel results in rapid absorption of 0.94 mole of hydrogen and gives 17 parts of 1:3-diethoxyisobutane, B. P. 145°/750 mm., $n_D^{20}$ 1.4012.

Example 15

A mixture consisting of 264 parts of 1:1:3-triethoxypropane and 5.8 parts of quinoline and containing no acidic material is passed with nitrogen through a glass tube at 355° C.±3°, the contact time being 53 seconds. The product on fractionation affords: 1.6 parts of ethanol, 1.5 parts of acrolein diethyl acetal, 12 parts of 1:3-diethoxypropene, and 220 parts of unchanged 1:1:3-triethoxypropane.

*Example 16*

A mixture of 205 parts 1:1-dibutoxy-3-ethoxypropane, 0.16 part of diisopropyl sulphate and 3.5 parts of quinoline is passed with nitrogen through a glass tube at 350° C.±5° C., so that the contact time is 50 seconds. Fractional distillation of the product gives: 16 parts of ethanol, 24 parts of butanol, 40.5 parts of 1-butoxy-3-ethoxyprop-1-ene, B. P. 80.2–80.6°/10 mm., $n_D^{20}$ 1.4286, 56 parts of acrolein dibutyl acetal, B. P. 86°/10 mm., $n_D^{20}$ 1.4205, and 49 parts of unchanged 1:1-dibutoxy-3-ethoxypropane.

Hydrogenation of 7 parts of 1-butoxy-3-ethoxyprop-1-ene in 50 parts of ethyl acetate over 5 parts of Raney nickel at 15° and 743 mm. results in the uptake of hydrogen (0.96 mole) and gives 6.3 parts of purified 1-butoxy-3-ethoxypropane, B. P. 181–182/734 mm., $n_D^{20}$ 1.4102.

*Example 17*

A mixture of 270 parts of 1:1:3-trimethoxypropane, 0.36 part of diisopropyl sulphate, and 7.7 parts of quinoline is passed with nitrogen through a glass tube kept at 350° C.±3° C., the contact time being 48 seconds. The reaction-product on fractionation gives the methanol-acrolein dimethyl acetal azeotrope, B. P. 22°/121 mm.; $n_D^{20}$ 1.3622 and then acrolein dimethyl acetal, B. P. 40°/120 mm., $n_D^{20}$ 1.3962; the total amount of methanol is 45 parts, and of the acetal 60.5 parts. The higher-boiling material comprises 89 parts of 1:3-dimethoxypropene, B. P. 69°/125 mm., $n_D^{20}$ 1.4205, and 53 parts of unchanged 1:1:3-trimethoxypropane.

*Example 18*

A mixture of 264 parts of 1:1:3-triethoxypropane, 0.27 part of diisopropyl sulphate, and 7.7 parts of quinoline is passed with an equal gas-volume of nitrogen through a glass tube kept at 350° C., so that the contact time is 45 seconds. From the product are isolated by fractional distillation 54.5 parts of ethanol, 80 parts of acrolein diethyl acetal, 76.5 parts of 1:3-diethoxypropene, and 43.5 parts of unchanged 1:1:3-triethoxypropane.

*Example 19*

A mixture of 390 parts of 1:1:3-tri-n-butoxypropane, 0.27 part of diisopropyl sulphate, and 6 parts of quinoline is passed with an equal gas-volume of nitrogen through a glass tube at 350° C.±5°, the contact time being 49 seconds. The reaction product on fractional distillation affords 91 parts of n-butanol, 93 parts of acrolein di-n-butyl acetal, 97 parts of 1:3-di-n-butoxypropene, and 61 parts of unchanged 1:1:3-tributoxypropane.

We claim:

1. A process which comprises pyrolysing a propane derivative of the formula $$RO-CH_2-CHR^3-CH(OR^1)(OR^2)$$

in which R, $R^1$ and $R^2$ are selected from the group consisting of alkyl, aryl, aralkyl and cycloalkyl radicals, and $R^3$ is selected from the group consisting of hydrogen and alkyl radicals, in the presence of a cracking catalyst selected from the group consisting of sulphuric acid, an organic ester of sulfuric acid and quinoline and in a homogeneous phase at a temperature between 200° C. and 450° C. to give a mixture of a diether of 1:3-dihydroxypropene of the formula $$RO-CH_2-CR^3=CH(OR^1)$$

and an acrolein acetal of the formula $$CH_2=CR^3-CH(OR^1)(OR^2)$$

where in each formula R, $R^1$, $R^2$ and $R^3$ have the significance indicated above, and isolating said diether of 1:3-dihydroxypropene and said acrolein acetal from the reaction product.

2. A process as in claim 1, wherein the pyrolysis is effected at a temperature in the range 325° C. to 425° C.

3. A process as in claim 1, wherein the cracking catalyst is sulphuric acid.

4. A process as in claim 1, wherein the cracking catalyst is an alkyl sulphate.

5. A process as in claim 1, wherein the cracking catalyst is di-isopropyl sulphate.

6. A process as in claim 1, wherein the cracking catalyst is dimethyl sulphate.

7. A process as in claim 1, wherein the cracking catalyst is quinoline.

8. A process as in claim 1, wherein R, $R^1$ and $R^2$ are lower alkyl radicals, and $R^3$ is selected from the group consisting of hydrogen and methyl radicals.

9. A process which comprises pyrolysing a propane derivative of the formula $$RO-CH_2-CH_2-CH(OR^1)(OR^2)$$

in which R, $R^1$ and $R^2$ are selected from the group consisting of alkyl, aryl, aralkyl and cycloalkyl radicals, in the presence of a stabilising agent and in the presence of an acidic cracking catalyst selected from the group consisting of sulfuric acid, an organic ester of sulfuric acid and quinoline, in a homogeneous phase, at a temperature between 200° C. and 450° C. to give a mixture of a diether of 1:3-dihydroxypropene of the formula $$RO-CH_2-CH=CH(OR^1)$$

and an acrolein acetal of the formula $$CH_2=CH-CH(OR^1)(OR^2)$$

where in each formula R, $R^1$ and $R^2$ have the significance indicated above, and isolating said diether of 1:3-dihydroxypropene and said acrolein acetal from the reaction product.

10. A process as in claim 9, wherein the stabiliser is pyridine.

11. A process as in claim 9, wherein the stabiliser is quinoline.

References Cited in the file of this patent

UNITED STATES PATENTS

| Number | Name | Date |
|---|---|---|
| 2,124,686 | Carothers | July 26, 1938 |
| 2,189,529 | Carothers | Feb. 6, 1940 |
| 2,338,297 | Mugdon | Jan. 4, 1944 |
| 2,383,790 | Harvey | Aug. 28, 1945 |
| 2,434,110 | Hatch | Jan. 6, 1948 |
| 2,479,068 | Gresham | Aug. 16, 1949 |
| 2,495,313 | Bludworth | Jan. 24, 1950 |
| 2,555,270 | Deeble | May 29, 1951 |

FOREIGN PATENTS

| 553,177 | Germany | June 22, 1932 |

OTHER REFERENCES

Feiser: "Organic Chemistry," pp. 96–98 (1944), Heath & Co., publishers.